United States Patent
Babcock et al.

(10) Patent No.: US 8,860,273 B2
(45) Date of Patent: Oct. 14, 2014

(54) EXTERNAL FIELD INTERACTION MOTOR

(75) Inventors: Paul M. Babcock, Spokane Valley, WA (US); David J. Babcock, Spokane, WA (US); Phillip N. Smith, Spokane Valley, WA (US)

(73) Assignee: Flyback Energy, Inc., Spokane, WA (US)

( * ) Notice: Subject to any disclaimer, the term of this patent is extended or adjusted under 35 U.S.C. 154(b) by 596 days.

(21) Appl. No.: 12/980,095

(22) Filed: Dec. 28, 2010

(65) Prior Publication Data

US 2011/0156522 A1     Jun. 30, 2011

Related U.S. Application Data

(60) Provisional application No. 61/290,259, filed on Dec. 28, 2009.

(51) Int. Cl.
*H02K 1/27*     (2006.01)
*H02K 21/24*   (2006.01)

(52) U.S. Cl.
CPC ..................................... *H02K 21/24* (2013.01)
USPC .................................. 310/156.43; 310/156.55

(58) Field of Classification Search
USPC .......... 310/156.18, 156.43, 156.55, 164, 208, 310/273, 156.02, 156.32
See application file for complete search history.

(56) References Cited

U.S. PATENT DOCUMENTS

| | | |
|---|---|---|
| 448,326 A | 3/1891 | Eickemeyer |
| 3,581,117 A | 5/1971 | Dixon, Jr. |
| 3,614,474 A | 10/1971 | Hahn |
| 3,665,227 A * | 5/1972 | Busch ............................. 310/46 |
| 4,055,789 A | 10/1977 | Lasater |
| 4,160,920 A | 7/1979 | Courier de Mere |

(Continued)

FOREIGN PATENT DOCUMENTS

| | | |
|---|---|---|
| DE | 3425414 | 7/1984 |
| EP | 0151199 | 2/1984 |

(Continued)

OTHER PUBLICATIONS

He, "An Improved Energy Recovery Soft-Switching Turn-on/Turn-off Passive Boost Snubber with Peak Voltage Clamp," APEC 2000, Fifteenth Annual IEEE, vol. 2, pp. 699-706.

(Continued)

*Primary Examiner* — Quyen Leung
*Assistant Examiner* — Naishadh Desai
(74) *Attorney, Agent, or Firm* — Craige Thompson; Thompson Patent Law (57) ABSTRACT

Apparatus and associated methods involve thrust generation by interaction of an armature field with a stator field in an arrangement with substantially reduced flux coupling from the armature to the stator coil. In an illustrative example, solenoid coil segments may be arranged as the stator along a path of motion for the armature. In some examples, each armature may surround and overlap with at least one of the toroidal coil segments. Counter-electromotive force may be substantially reduced, for example, by stopping current flow in a stator coil while overlapped by the armature or while substantial armature flux couples to the stator coil. Thrust may be generated, in some examples, by interaction of armature and stator coil flux in arc-shaped regions external to and between each of the leading and trailing edges of the armature and their respective nearby stator coils.

20 Claims, 7 Drawing Sheets

(56) References Cited

U.S. PATENT DOCUMENTS

| | | | |
|---|---|---|---|
| 4,330,742 A | 5/1982 | Reimers | |
| 4,356,440 A | 10/1982 | Curtiss et al. | |
| 4,549,121 A | 10/1985 | Gale | |
| 4,565,938 A | 1/1986 | Fawzy | |
| 4,581,543 A | 4/1986 | Herberg | |
| 4,651,066 A | 3/1987 | Gritter et al. | |
| 4,661,747 A | 4/1987 | Gray, Sr. | |
| 4,663,547 A | 5/1987 | Baliga et al. | |
| 4,724,368 A | 2/1988 | Andrews | |
| 4,763,053 A | 8/1988 | Rabe | |
| 4,768,075 A | 8/1988 | Broich et al. | |
| 4,816,891 A | 3/1989 | Nishizawa | |
| 4,937,726 A | 6/1990 | Reustle | |
| 4,947,071 A | 8/1990 | Clarke | |
| 4,965,864 A | 10/1990 | Roth et al. | |
| 5,003,241 A | 3/1991 | Rowan et al. | |
| 5,047,913 A | 9/1991 | De Doncker et al. | |
| 5,283,726 A | 2/1994 | Wilkerson | |
| 5,329,195 A | 7/1994 | Horber et al. | |
| 5,334,898 A | 8/1994 | Skybyk | |
| 5,449,989 A | 9/1995 | Correa et al. | |
| 5,554,903 A | 9/1996 | Takara | |
| 5,568,368 A | 10/1996 | Steigerwald et al. | |
| 5,682,086 A | 10/1997 | Moo et al. | |
| 5,717,562 A | 2/1998 | Antone et al. | |
| 5,773,908 A | 6/1998 | Stephens et al. | |
| 5,798,591 A * | 8/1998 | Lillington et al. | 310/164 |
| 6,166,500 A | 12/2000 | Makaran | |
| 6,175,484 B1 | 1/2001 | Caruthers et al. | |
| 6,266,257 B1 | 7/2001 | Geissler | |
| RE37,576 E | 3/2002 | Stephens et al. | |
| 6,380,707 B1 | 4/2002 | Rosholm et al. | |
| 6,384,553 B1 | 5/2002 | Liu | |
| 6,389,169 B1 | 5/2002 | Stark et al. | |
| 6,392,370 B1 | 5/2002 | Bedini | |
| 6,717,827 B2 | 4/2004 | Ota | |
| 6,812,609 B2 * | 11/2004 | Anwander | 310/156.55 |
| 7,126,833 B2 | 10/2006 | Peng | |
| 7,336,512 B2 | 2/2008 | Geissler | |
| 7,427,841 B2 | 9/2008 | Hamaoka et al. | |
| 7,778,056 B2 | 8/2010 | Geissler | |
| 2001/0017493 A1 | 8/2001 | Sakamoto | |
| 2002/0097013 A1 | 7/2002 | Bedini | |
| 2003/0025408 A1 | 2/2003 | Miekka et al. | |
| 2003/0086619 A1 | 5/2003 | Nagaishi | |
| 2003/0099561 A1 | 5/2003 | Heydt et al. | |
| 2004/0061397 A1 | 4/2004 | Rose | |
| 2005/0140237 A1 * | 6/2005 | Souris et al. | 310/166 |
| 2005/0163344 A1 | 7/2005 | Kayahara et al. | |
| 2005/0234323 A1 | 10/2005 | Kayahara et al. | |
| 2006/0012259 A1 | 1/2006 | Kerlin | |
| 2006/0061224 A1 | 3/2006 | Mullin et al. | |
| 2006/0219513 A1 | 10/2006 | Organek | |
| 2007/0146958 A1 | 6/2007 | Babcock et al. | |
| 2008/0197819 A1 | 8/2008 | Thompson et al. | |
| 2009/0073726 A1 | 3/2009 | Babcock | |
| 2009/0195199 A1 | 8/2009 | Ito | |
| 2010/0007223 A1 | 1/2010 | Denne | |
| 2010/0213885 A1 | 8/2010 | Ichiyama | |

FOREIGN PATENT DOCUMENTS

| | | |
|---|---|---|
| EP | 0319660 | 6/1989 |
| EP | 0902527 | 3/1999 |
| FR | 2611098 | 2/1987 |
| JP | 60-107917 | 6/1985 |
| JP | 07/322634 | 8/1995 |
| JP | 9084352 | 3/1997 |
| JP | 10066203 | 3/1998 |
| JP | 10/066203 | 6/1998 |
| KR | 1029970078524 | 8/2007 |
| WO | WO9531853 | 11/1995 |
| WO | WO99-38247 | 7/1999 |

OTHER PUBLICATIONS

Grossner, Nathan, "Transformers for Electronic Circuits," Feb. 1983, 2nd Ed. McGraw-Hill, pp. 132-173.
"Beware of Zero-Crossover Switching of Transformers," Tyco Electronics Corporation—P&B, Application Note, pp. 1-2. (Believed to have been published before Jan. 1, 2001).
International Search Report and Written Opinion in PCT/US2008/076895 May 13, 2009, 7 pages.
"Active-Clamp Snubbers for Isolated Half-Bridge DC-DC Converters." Hong Mao et al.; IEEE Transactions on Power Electronics pp. 1294-1302, vol. 20, No. 6, Nov. 2005.
"A Novel Energy Recycling Clamp Circuit," Ten Liu, et al., IEEE Transactions, pp. 1205-1209, 2005.
"A simple Energy Recovery Circuit for High-Power Inverters with Complete Turn-on and turn-off Snubbers," Xiangning He, IEEE Transactions on Industrial Electronics 7 pgs. V5.
"New Snubbers with Energy with Energy Recovery into a Local Power Supply" Gregory Ivensky, et al. IEEE Transactions, pp. 1327-1332, 2003.
"Passive Snubber Energy Recovery for a GTO Thyristor Inverter Bridge Leg," Barry Williams, IEEE Transactions on Industrial Electronics, pp. 2-8, V47, No. 1, Feb. 2000.
"Novel Three-Phase SMR Converter with Inherent Snubber Energy Recovery Capability", Yashuir Okuma, IEEE Transactions on Industry Applications, pp. 326-334, V32, No. 2 Mar. 96.
"A Low-Loss Full-Bridge PWM DC-DC Converter Topology," Vassilios G. Agelidis, et al., IEEE Transactions, pp. 531-537, 1993.
"Soft Switching Active Snubbers for DC/DC Converters," Ahmed Elasser, IEEE Transactions 1996, pp. 483-489.
A High Switching Frequency IGBT PWM Rectifier/Inverter System for AC Motor Drives Operating from Single Phase Supply, K. Thiyagarajah, IEEE Transactions, pp. 576-584, V6 No. 4.
"Recovery Circuit for Snubber Energy in Power Electronic Applications with High Switching Frequencies." Johan C. Bendien, IEEE Transactions, pp. 26-30, V3, No. 1 Jan. 1988.
"Active Clamp Resets Transformer in Converters," Bob Bell, Power Electronics Technology, pp. 26-32, Jan. 2004.
International Preliminary Report on Patentability in PCT/US2006/062664, mailed Jul. 10, 2008, 8 pages.
International Search Report and Written Opinion in PCT/US2006/062664, mailed May 31, 2007, 13 pages.
European Office Action of Application No. EP06851335.7, dated Dec. 7, 2010, 3 pages.
Response to EP Office Action of application No. EP06851335.7, dated Aug. 5, 2010, 2 pages.
European Patent Office Action of Application No. 06851335.7, dated Apr. 16, 2010, 5 pages.
"The Power Transformer Syntheses" Chapter 5, pp. 132-173, believed to be published before Dec. 1, 2004.
U.S. Appl. No. 60/973,224, applicant Paul M. Babcock, filed Sep. 18, 2007.
Bongwon Suh et al., "Automatic Thumbnail Cropping and its Effectiveness" UIST 03 Proceedings ACM Symposium on User Interface Software & Technology, Nov. 2-5, 2003.
Patent Abstract of Japan, vol. 2003, No. 12, Dec. 5, 2003 & JP 2004/28059.
Patent Abstract of Japan, vol. 2003, No. 12, Dec. 5, 2003 & JP 2005050051.
International Search Report and Written Opinion in PCT/US2010/062273, Apr. 6, 2011, 11 pages.
Japanese Office Action from Japanese application No. 2008-548848, dated Apr. 25, 2012, 6 pages.
International Search Report from EP application No. 12162382.1-2207 dated Aug. 28, 2012, 8 pages.
Chinese Office Action from CN appl. No. 20080116304.7, dated Aug. 22, 2012, 6 pages.
First Patent Examination Report, Australian Patent Application No. 2008302264, 3 pages, dated Sep. 4, 2012.
International Search Report and Written Opinion in PCT/US2010/062278, Apr. 27, 2011, 9 pages.
Japanese Foreign Office Action, Application No. 2010-525978, Received Aug. 30, 2013, 4 pages.

* cited by examiner

EXTERNAL FIELD INTERACTION MOTOR

CROSS-REFERENCE TO RELATED APPLICATIONS

This application claims benefit to U.S. Application Ser. No. 61/290,259, entitled "Electric Machine System," as filed on Dec. 28, 2009 by Babcock, et al., the entire contents of which are fully incorporated by reference herein.

TECHNICAL FIELD

Various embodiments relate generally to electromagnetic thrust production.

BACKGROUND

Electric motors are widely used in the production of many different types of products. Pumps for refrigeration, fans, water wells, hand tools, and even electric propulsion for various types of motor vehicles are widely adopted.

In general, electric motors produce mechanical work based on some manipulation of one or more magnetic fields. Magnetic fields are associated with electrical current. Under proper circumstances, the energy stored in a magnetic field by a current can be translated into mechanical torque on a rotating shaft, or thrust in a linear system. Torque or thrust represent a mechanical force that can accelerate or decelerate an object.

In general, rotating motors may easily outnumber linear motors. There are several types of rotating motors. For example, DC (direct current) motors can operate from a DC voltage or current source, such as a battery. Induction and synchronous motors may call for a time-varying excitation (e.g., AC) to couple flux through a small air gap between a rotor and a stator. Reluctance motors may produce torque based on preferred paths for a magnetic field through a core, for example.

SUMMARY

Apparatus and associated methods involve thrust generation by interaction of an armature field with a stator field in an arrangement with substantially reduced flux coupling from the armature to the stator coil. In an illustrative example, solenoid coil segments may be arranged as the stator along a path of motion for the armature. In some examples, each armature may surround and overlap with at least one of the toroidal coil segments. Counter-electromotive force may be substantially reduced, for example, by stopping current flow in a stator coil while overlapped by the armature or while substantial armature flux couples to the stator coil. Thrust may be generated, in some examples, by interaction of armature and stator coil flux in arc-shaped regions external to and between each of the leading and trailing edges of the armature and their respective nearby stator coils.

In one exemplary aspect, an electromagnetic device includes a plurality of stationary field generator modules arranged along a path of motion. Each one of the stationary field generator modules includes a central axis extending between first and second opposite ends and lying substantially along the path of motion, and an electric coil arranged to produce a stator magnetic field oriented radially with respect to the path of motion and lying substantially within a field interaction plane that is orthogonal to the path of motion. The device further includes at least one armature. Each of the at least one armatures includes a base member extending between opposite first and second faces and arranged to partially surround one or more of the plurality of stationary field generator modules as the armature travels along the path of motion, and an armature field generator module arranged to produce an armature magnetic field comprising magnetic flux oriented radially with respect to the path of motion and lying substantially within the field interaction plane. The device further includes a linking member to support and guide the armature along the path of motion in response to thrust on the armature generated in response to interaction of the stator magnetic field and the armature magnetic field in the field interaction plane.

In some embodiments, the field interaction plane is disposed in a region between the stationary field generator module producing the stator magnetic field and the armature producing the armature magnetic field.

In another exemplary aspect, a method to accelerate a load includes providing a plurality of toroidal coil segments, each of the coil segments being arranged with a central axis aligned substantially tangential to a path of motion. The method further includes providing an armature base movable along the path of motion, and generating from the armature base a first radially-directed magnetic flux in a first substantially arc-shaped region in a first plane exterior to the armature base. The first plane intersects and is substantially orthogonal to the path of motion. Another step includes generating from at least one of the plurality of toroidal coil segments a second radially-directed magnetic flux in at least a portion of the first substantially arc-shaped region.

In examples, the step of generating from at least one of the plurality of toroidal coil segments the second radially-directed magnetic flux in at least a portion of the first substantially arc-shaped region may include applying a current signal of a first polarity to a winding associated with the at least one of the plurality of toroidal coil segments. The step of applying the current signal may include injecting a current signal of the first polarity when the armature is positioned relative to one of the plurality of toroidal coil segments such that the second radially-directed magnetic flux generated in response to the applied current signal lies within the first plane exterior to the armature base. The step of applying the current signal further may include ceasing to inject the current signal to the toroidal coil segment while an amount of flux coupling from the armature to the toroidal coil segment exceeds a predetermined threshold level. The method may further include injecting a second current signal of opposite polarity to the first polarity when the armature is positioned relative to the toroidal coil segment such that the second radially-directed magnetic flux generated in response to the second current signal lies within a second plane exterior to the armature base and on an opposite side of the armature relative to the first plane.

The method may include disabling current flow in each one of the toroidal coil segments to reduce counter-electromotive force (CEMF) as each one of the coil segments is overlapped by the armature. The method may further include disabling current flow in each one of the toroidal coil segments to reduce counter-electromotive force (CEMF) as each one of the coil segments couples more than a predetermined amount of magnetic flux from the armature.

The method may include the following further steps: generating from the armature base a third radially-directed magnetic flux in a second substantially arc-shaped region in a second plane exterior to the armature base on an opposite side of the armature relative to the first plane. The second plane may intersect and/or be substantially orthogonal to the path of motion. The method may include generating from at least one of the plurality of toroidal coil segments a fourth radially-directed magnetic flux in at least a portion of the second substantially arc-shaped region. The third radially-directed flux may be directed in an opposite orientation with respect to said first radially-directed flux, and said fourth radially-directed flux may be directed in the same orientation with respect to said second radially-directed flux.

In another exemplary aspect, an electromagnetic device includes a plurality of stationary field generator modules arranged along a path of motion. Each one of the stationary field generator modules includes a central axis extending between first and second opposite ends and lying substantially along the path of motion, and an electric coil responsive to a current signal in a first polarity to produce a north pole having a magnetic field oriented radially and directed outward substantially within a first plane that is orthogonal to a line extending from the central axis to a point exterior to the first end, and responsive to the current signal in the first polarity to produce a south pole having a magnetic field oriented radially and directed inward substantially within a second plane that is orthogonal to a line extending from the central axis to a point exterior to the second. The device also includes at least one armature. Each of the at least one armatures includes a base member extending between opposite first and second faces and arranged to partially surround one or more of the plurality of stationary field generator modules as the armature travels along the path of motion, and an armature field generator module arranged to generate a north pole magnetic field comprising magnetic flux oriented radially outward substantially within a third plane that is orthogonal to the path at a point exterior to the first face. The armature further includes an armature field generator module arranged to generate a south pole magnetic field comprising magnetic flux oriented radially inward substantially within a fourth plane that is orthogonal to the path at a point exterior to the second face. The device also includes a linking member to guide the armature along the path of motion in response to thrust of the armature generated upon intersection of either of the first or second planes with either of the third or fourth planes.

In some embodiments, the device may further include a shaft coupled to the linking member for coupling to a load to transfer energy from the at least one armature to the load. The central axis may be linear in at least one of the plurality of stationary field generators, or it may include a curved portion in at least one of the plurality of stationary field generators. The stationary field generator modules define a substantially cylindrical geometry with a central axis disposed tangential to the path.

The north pole may be orthogonal to a line extending from the central axis to the point exterior to the first end, and the south pole may be orthogonal to a line extending from the central axis to the point exterior to the second end. The intersecting planes may be approximately co-planar. The path may include at least one curvilinear portion.

Various embodiments may achieve one or more advantages. For example, some embodiments may achieve substantially improved acceleration and thrust or torque at high speed, which may be associated with the control of counter-electromotive force (which may also be referred to herein as back-emf or CEMF). Some embodiments may achieve high thrust/torque with a substantial reduction in machine weight and cost, for example. For example, with non-metallic housing and/or reduction or elimination of metallic or high magnetic permeability shielding to control a relatively low level of stray flux. Advantageously, switching may be performed at low (e.g., synchronous) frequency using flyback capture techniques and apparatus, which may further enable stronger magnetic field production at enhanced efficiency levels with substantially negligible electromagnetic emissions (e.g., EMI). Robust speed control speed may be implemented in some cases with simple angular position feedback. Embodiments may further benefit in volume manufacturing cost and reliability from a highly modular construction. High thrust/weight ratios may be implemented for rotational, curvilinear, and/or linear motor applications.

The details of various embodiments are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION OF ILLUSTRATIVE EMBODIMENTS

To aid understanding, this document is organized as follows. First, exemplary motor construction in various embodiments is introduced with reference to FIGS. 1-5. Disclosed structures may generate torque-producing field interactions in arc-shaped regions surrounding the stator and located ahead of a leading edge and/or behind a trailing edge of each armature. Second, with reference to FIGS. 6-9, the discussion turns to exemplary embodiments that illustrate external flux interaction for torque generation. Next, with reference to FIGS. 10-12, further discussion explains exemplary stator drive and control approaches, including discussion of operation of the motor with substantially reduced counter-emf. Finally, the detailed description section concludes with additional disclosure of various embodiments, features and implementation examples.

Figure 1:
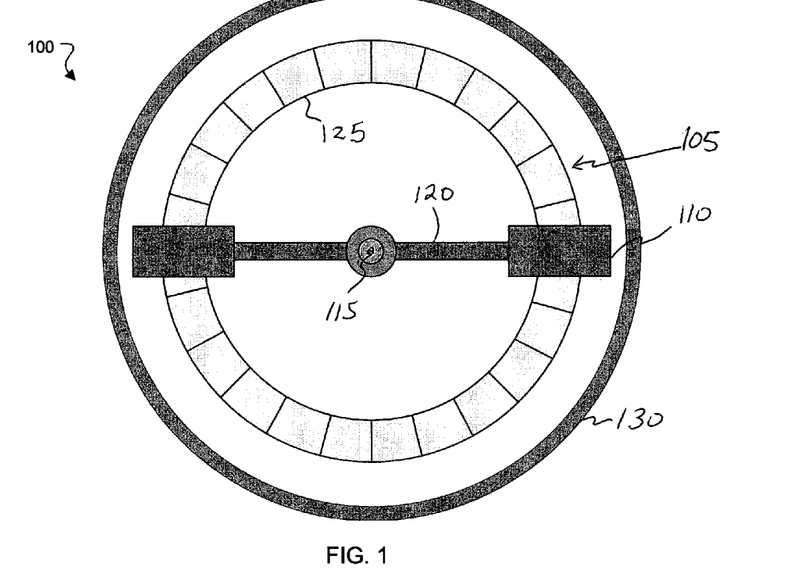
FIGS. 1-2 show top and cross-section views of an exemplary motor with external field interaction for torque production.
Figure 2:
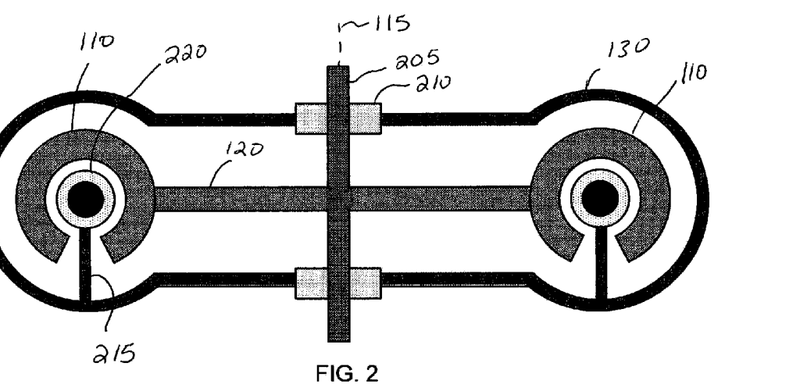

FIGS. 1-2 show top and cross-section views of an exemplary motor with external field interaction for torque production.

FIG. 1 is a top-down view, which shows the mechanical arrangement of electric motor 100, depicted in this example as a rotating machine, although this is only by way of example and not limitation. Various embodiments and features disclosed herein can be readily adapted to a stator arranged along a motion path that includes linear and/or curvilinear segments.

The motor 100 includes a segmented stator 105 formed by a number of solenoidal coils disposed along a path of motion for a pair of armature modules 110. In this example, the two opposing armature modules 110 rotate about an axis 115, to which each of the armature modules 110 are connected by an armature linkage member 120.

The stator 105 includes a series of segments 125. Each of the segments 125 may include a solenoid-wound coil, which may be independently controllable by a segment drive, examples of which will be described with reference to FIGS. 10-12. Each of the segments 125 is depicted as having an arc shape with opposing ends that each lie in a plane that contains the axis 115. Each of the segments 125 may be formed into a shape that follows a path of motion. In various applications, the armature modules 110 may traverse a path of motion that includes curvature (e.g., rotating machines, non-linear paths for a linear motor) and/or straight lines (e.g., point-to-point transfer). For example, material transfer devices, high-speed trains or light rail applications could implement a series of stator segments 125 disposed along a rail line to accelerate a load, such as a rail car, which may be coupled to one or more of the armature modules 110.

The motor 100 includes a housing 130 that substantially encloses the stator 105 and armature modules 110. This housing 130 may provide safety against injury or damage during high speed operation of the motor 100. In some applications, the housing may be formed of a low magnetic permeability. For example, the housing 130 may have a relative magnetic permeability of up to about 1.02, 1.05, 1.08, 1.1, 1.2, 1.4, 1.6, 1.8, or up to about 2.0. In examples with low stray magnetic flux levels, the motor 100 may advantageously have a lightweight design, for example, by providing a plastic housing 130. In some applications, the weight of the motor 100 may be reduced and/or the stator may be held in position by a non-metallic, nonconductive housing 130. Low permeability and/or non-conductive housings 130 may advantageously reduce manufacturing cost, materials cost, lower maintenance and/or reduce motor weight, in some examples. Advantageously, the solenoidal coil segments 125 may generate relatively low stray magnetic flux, as will be described in further detail with reference to, for example, FIG. 5.

FIG. 2 depicts a cross-sectional view showing an exemplary interior view of the motor 100. The motor 100 includes a shaft 205 along the rotational axis 115. The shaft 205 is supported within the housing by a bearing 210. The shaft 205 is joined to the armature modules 110 by the armature linkage member 120. Electromagnetic torque generated by interaction of the external fields between the armature 110 and the stator 105 is transferred to the shaft 205 and thereby to any load (not shown) that may be coupled to the shaft 205.

The stator 105 is shown supported on the housing 130 by support member 215. The armature 110 wraps substantially around a solenoid coil 220 of the stator 105. In various embodiments, the motor 100 may generate torque by interaction of the armature field with a stator field in a region (e.g., several degrees) ahead of the leading face of the armature module 110, where the leading face is understood to be the face oriented toward the direction of armature motion. By proper selection of the orientation of the stator fields in selected ones of the segments 125, reinforcing field interactions may be achieved in the spatial region ahead of the leading face and behind the trailing face, which is opposite the leading face. These reinforcing field interactions may accelerate or decelerate the motor 100. In some examples, the segment(s) 125 that are overlapped by the armature modules 110 may be maintained in a substantially zero current state, thereby substantially reducing the counter-electromotive force (e.g., back-emf) associated with time-varying coupling of armature flux to the stator coils. Dramatic reduction or substantial elimination of significant back-emf may advantageously enhance acceleration (or deceleration), torque at high speed ranges, and/or maximum speed capability for a given excitation voltage level.

For purposes of controlling operation of the stator and/or regulating speed, some embodiments may include a feedback sensor that detects position of the armature modules. By way of example and not limitation, armature position may be determined by hall effect sensors or search coils mounted, for example, on or embedded in the plastic interior wall of the housing 130. Some precision embodiments may include a shaft-mounted high resolution encoder or resolver to measure angular position of the shaft 205 and thus determine position of the armature modules 110.

Figure 3:
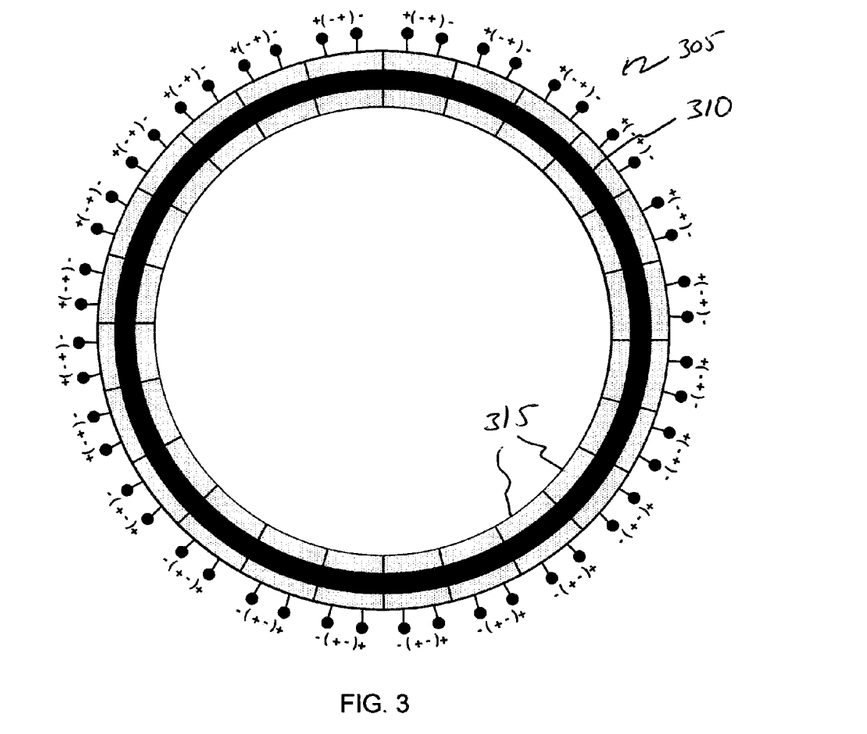
FIG. 3 shows a top view of an exemplary stator with segmented coils.

FIG. 3 shows a top view of an exemplary stator with segmented coils. This depicted stator 305 shows the physical and electrical arrangement of the stator. In this example, the core 310 of the stator is a continuous ring of ferrous material. The conductive windings 315 are segmented to produce individually controlled electromagnets. In some applications, the electromagnets may be driven by multi-polarity D.C. switches, examples of which are described with reference to FIGS. 10, 12. Each segmented winding 315 may be driven by a dedicated multi-polarity switch. This makes it possible to generate moving, multiple magnetic fields of either polarity through the stationary stator.

Figure 4:
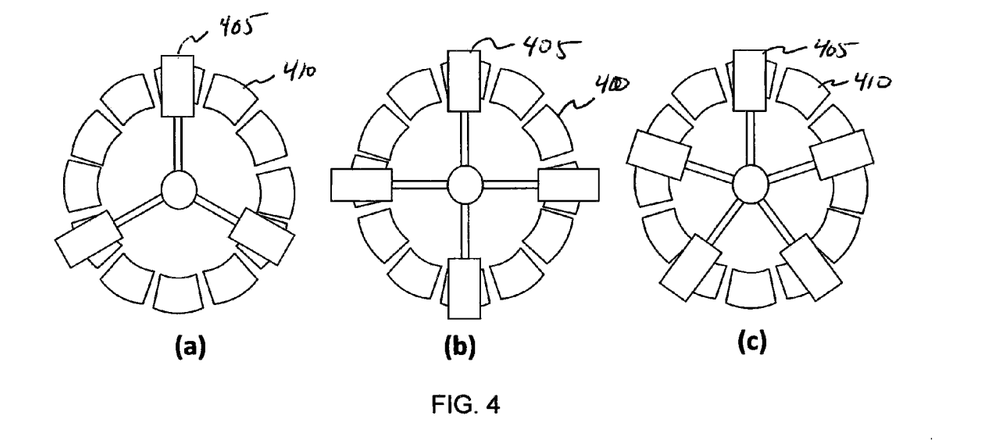
FIG. 4 shows top views of exemplary stators with exemplary armature embodiments.

FIG. 4 shows top views of exemplary stators with exemplary armature embodiments. In addition to the two armature embodiment of FIG. 1, other embodiments may have (a) three, (b) four, (c) five or more armature modules 405. In some example, there may be air gaps between the core segments 410 to permit localized stator fields to be generated to support both even and odd numbers of armatures. Further embodiments may include 6, 7, 8, 9, 10, 11, 12, 14, 16, 18, 20, 21, 24 or more coplanar armatures on each shaft. Sets of coplanar armatures may be coupled to a common shaft in parallel planes, for example. Each armature may contribute additional torque through external field interactions with the stator in the regions ahead of each armature's leading edge and behind each armature's trailing edge. Increased numbers of armatures may substantially reduce, for example, torque ripple amplitude.

With reference to FIG. 1, symmetry may allow two or more of the segments 125 to be controlled by a single driver, for example, where excitation timing (e.g., turn-on, turn-off times) are substantially the same. This may be the case, in the depicted example of FIG. 4b, for each pair of the segments 125 that are 180 degrees apart.

Figure 5A:
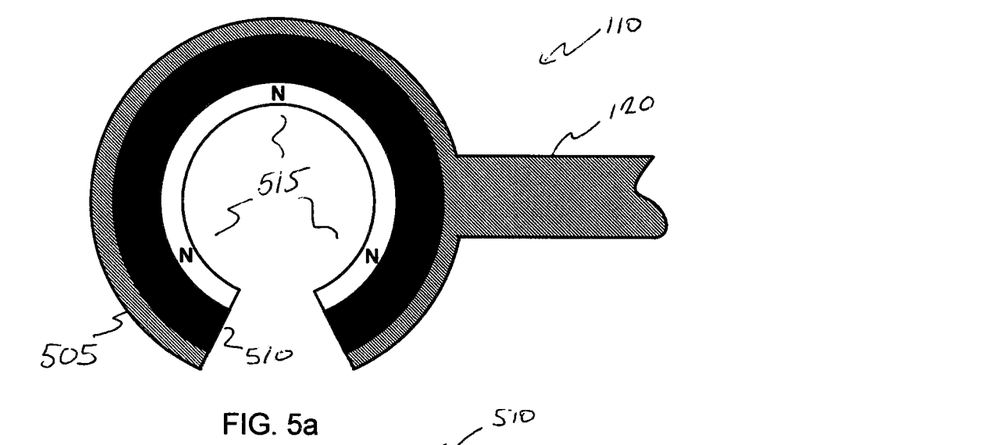
FIG. 5 shows side and top cross-section details of an exemplary armature with an array of permanent magnet elements in a horseshoe arrangement around the periphery of a horseshoe-shaped armature.
Figure 5B:
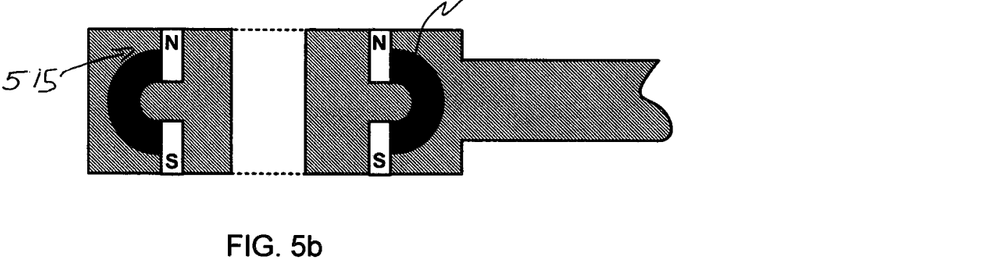

FIG. 5 shows side and top cross-section details of an exemplary armature with an array of permanent magnet elements in a horseshoe arrangement around the periphery of a horseshoe armature. The figure depicts the armature module 110 supported by the armature linkage member 120. At a distal end of the armature linkage member 120 is a support member 505 to surround and support a high permeability ring 510, which may be formed of a steel or ferrous material, for example, in a substantially cylindrical shape around a central axis. Armature fields are generated by permanent magnet 515, which is depicted in this view from a north pole. If the armature module 110 were viewed from the opposite side, the permanent magnet 515 may present a south pole, for example.

Figure 6A:
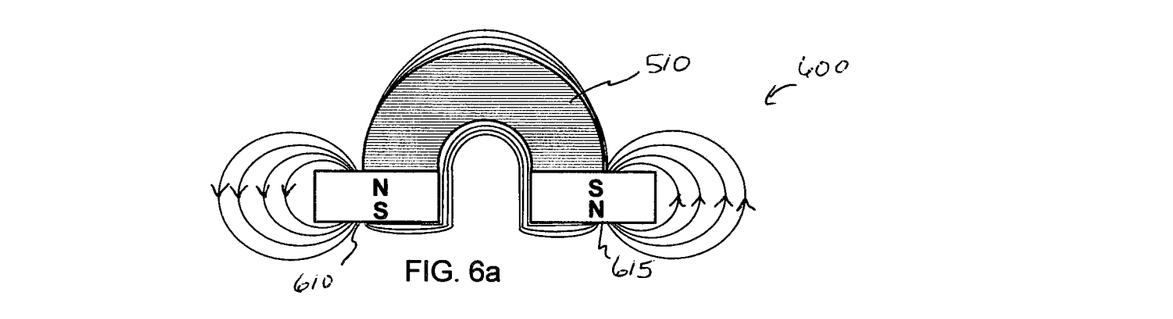
FIG. 6 shows a schematic diagram of one example embodiment of the permanent magnet elements of FIG. 5, with illustrative magnetic flux lines shown.
Figure 6B:
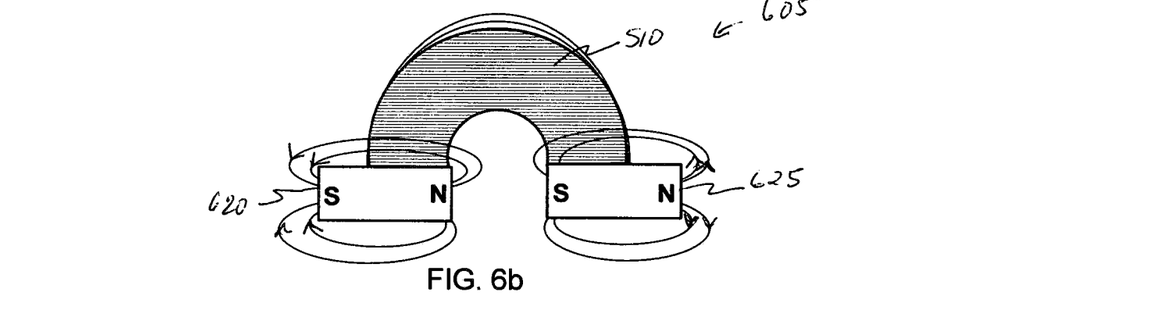

FIG. 6 shows a schematic diagram of exemplary embodiments of the permanent magnet elements of FIG. 5, with illustrative magnetic flux lines shown. In the depicted examples, an armature field generator element 600, 605 includes the high permeability ring 510 providing a low reluctance path for magnetic flux generated by permanent magnets 610, 615, 620, 625.

The permanent magnets 610, 615 are magnetized in an orientation with north and south poles adjacent the respective end poles of the ring 510 such that flux is oriented along respective axes orthogonal to the respective pole faces. The permanent magnets 620, 625 are magnetized in an orientation with north and south poles aligned to direct flux substantially parallel to the respective end poles of the ring 510.

In the armature field generator element 600, the permanent magnets 610 generates a radial field directed inward with respect to a central axis of the armature on a first face of the armature module 110. The permanent magnet 615 generates a radial field directed outward with respect to a central axis on a second face of the armature module 110, where the second face is on a side opposite from the first face. In one direction of rotation, one of the first and second faces would be considered the leading edge face, and the remaining face would be considered the trailing edge face.

Similarly, in the armature field generator element 605, the permanent magnets 620 generates a radial field directed inward with respect to a central axis of the armature on a first face of the armature module 110. The permanent magnet 625 generates a radial field directed outward with respect to a central axis on a second face of the armature module 110.

In these examples, a ferrous horseshoe ring, such as the ring 510, may be used to shape the magnetic fields produced by the permanent magnets in the armature heads. The ferrous horseshoe ring may provide a highly permeable path for the magnets lines of force. This creates a magnetic field shape like doughnuts, with a south-pole magnetic doughnut on one side of the armature head and a north-pole magnetic doughnut on the other side of the armature head.

In some embodiments, a suitable arc-shaped armature field may be generated in the region ahead of the leading edge and in the region behind the trailing edge of the armature by a discrete array of several modules 600 or 605 arranged at intervals around the periphery of the support member 505. With reference to FIG. 5a, the armature module 110 may include three modules 600, as shown as 515 in the depicted example.

Figure 7:
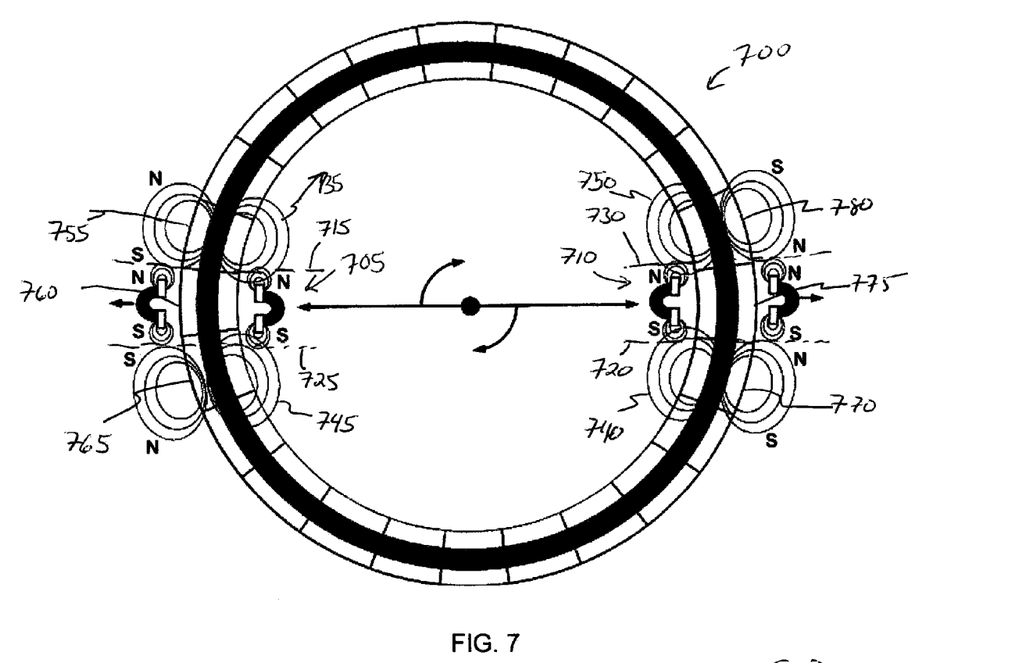
FIG. 7 shows a top view schematic diagram of the motor of FIG. 1, showing exemplary magnetic fields during thrust-generating operation.

FIG. 7 shows a top view schematic diagram of the motor of FIG. 1, showing exemplary magnetic fields during thrust-generating operation. This depicted drawing represents the relationship between the rotating magnetic fields of the stator to the permanent magnetic fields of the armature. In this two armature system, there are four points of force on the armature heads all in the same direction. N to N push, S to N pull, S to S push, N to S pull. The armature heads become trapped between the rotational stator fields causing the armature to rotate. The force of the push and pull points produces torque at the output shaft of the motor.

A motor 700 includes a pair of armatures 705, 710 adapted for traversing a circular motion path. In operation, torque may be produced by field interactions, for example, in one or more planes 715, 720 in a region ahead of a leading edge of the armatures 705, 710, respectively. Additional torque may be produced by field interactions, for example, in one or more planes 725, 730 in regions behind a trailing edge of the armatures 705, 710, respectively. Selective current injection into selected stator coil segments generate, in this example, stator fields 735, 740 with radial components in the planes 715, 720, respectively, and stator fields 745, 750 with radial components in the planes 725, 730, respectively. The interaction of radial components of the armature and stator fields generates a thrust on the armatures 705, 710. Polarity of the field interactions to produce positive or negative torque are disclosed in further detail with reference to FIGS. 8-9.

The depicted example presents exemplary shape and orientation of the magnetic fields generated by the stator. As will be described with reference to FIG. 11, the fields may be advanced incrementally by the binary logic generator with at least one de-energized stator segment between the two stator magnetic fields. Spacing, direction and density of the magnetic fields may be controlled by the switching circuitry and the binary logic pattern.

As depicted in the figure, stator segment coils 755, 760, 765 generate the fields 735, 745, and no field is generated by the coil 760 while it is in proximity (e.g., overlap) by the armature 705. Similarly, stator segment coils 770, 775, 780 generate the fields 740, 750, and no field is generated by the coil 775 while it is in proximity (e.g., overlap) by the armature 710. By not allowing current to flow in coils while overlapped by the armature, back-emf may be substantially reduced or avoided at high speeds.

In various embodiments, electrical induction from the armature's permanent magnets to the stator may be substantially eliminated because the armature heads are always positioned over stator segments that are in the off or open (e.g., non-conductive) electrical condition. No current path is completed in that stator segment so induction cannot occur. As such, the armature heads cannot produce opposing magnetic fields in the overlapped stator winding.

Figure 8:
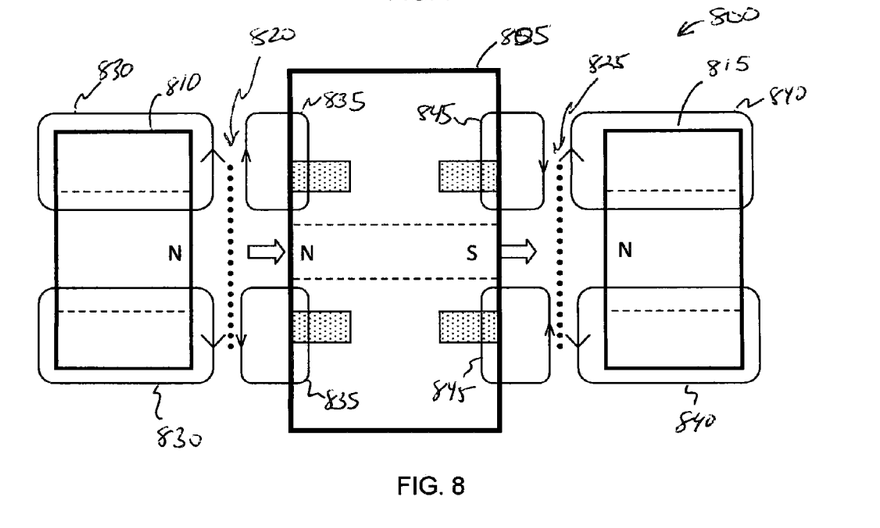
FIG. 8 shows a top view schematic diagram of an armature and stator to illustrate exemplary operation of magnetic fields in additional detail.

FIG. 8 shows a top view schematic diagram of an armature and stator to illustrate exemplary operation of magnetic fields in additional detail. In this illustrative example, a motor 800 includes an armature 805 with a trailing edge in motion away from a stator coil 810 and a leading edge in motion toward a stator coil 815. In operation, repulsive thrust is generated, by way of example and not limitation, by interaction of fields in an arc-shaped region that includes an interaction plane 820 behind the trailing edge of the armature 805. Attractive thrust is generated, by way of example and not limitation, by interaction of fields in an arc-shaped region that includes an interaction plane 825 in front of the leading edge of the armature 805.

In the interaction plane 820, an outward-directed radial magnetic field 830 generated by current in a solenoid winding of the stator coil 810 reinforces an outward-directed radial magnetic field 835 generated by permanent magnets and shaped by magnetic structures of the armature 805. The interacting fields may be distributed over an arc or horse-shoe shaped region in a volume on either side of the interaction plane 820. The interaction of the fields 830, 835 generate a repulsive force on the armature 835 in the direction away from the stator coil 810.

In the interaction plane 825, an outward-directed radial magnetic field 840 generated by current in a solenoid winding of the stator coil 815 weakens an inward-directed radial magnetic field 845 generated by permanent magnets and shaped by magnetic structures of the armature 805. The interacting fields may be distributed over an arc or horse-shoe shaped region in a volume on either side of the interaction plane 825.

The interaction of the fields 840, 845 generate an attractive force on the armature 835 in the direction toward the stator coil 815.

Advantageously, the solenoidal coil segments 810, 815 may generate relatively low stray magnetic flux. The flux generated by each of the stator segments, when active, includes a closed path that may be strongest in the region immediately in and around the segment, and substantially weaker elsewhere. As depicted in this example with reference to the coil 810, the closed magnetic path for an active segment includes: an external tangential component directed substantially parallel to the segments 810 from a first end to an opposing second end of the segment, an exterior and radially-directed segment of inward directed flux adjacent the second end, an internal tangential component directed substantially parallel to the segment from the second end to the first end, and an exterior and radially-directed segment of outward directed flux adjacent the first end.

Figure 9:
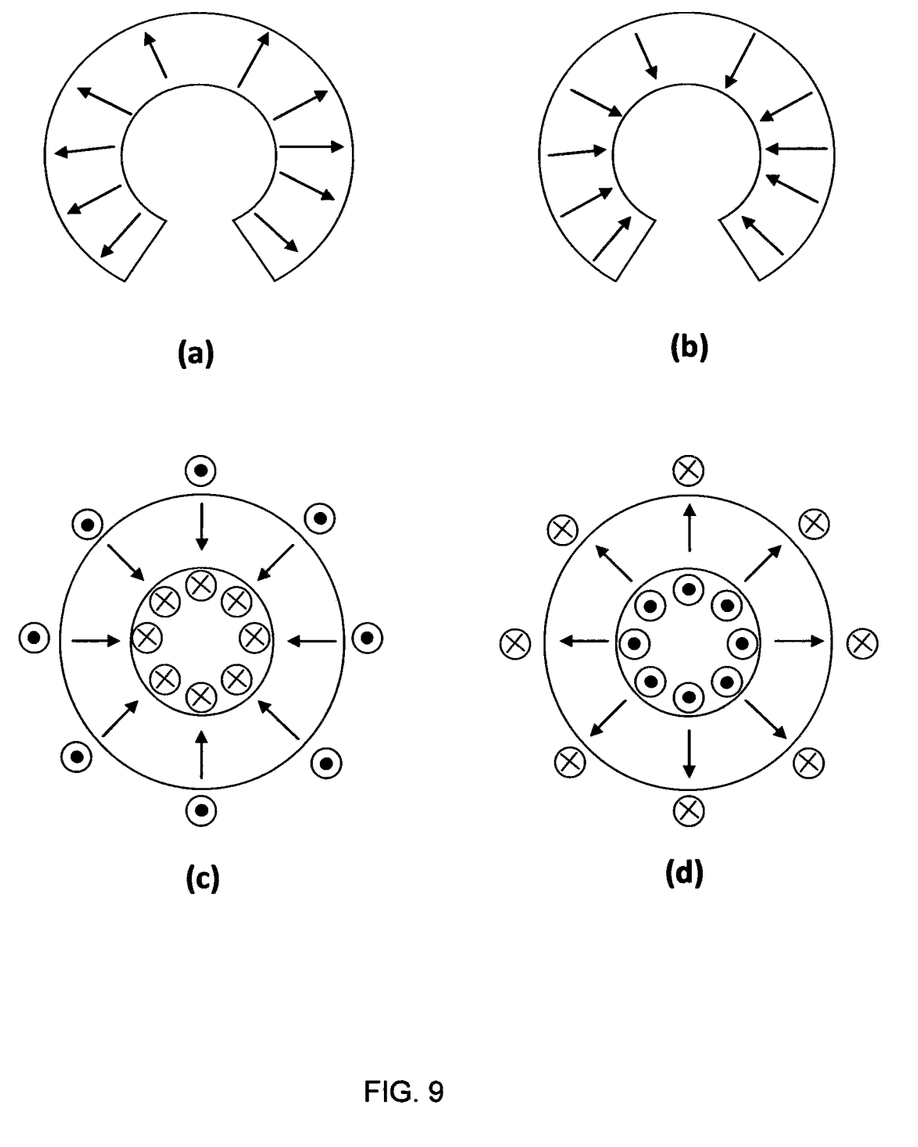
FIG. 9 shows schematic diagrams exemplary armature and stator magnetic fields in an interaction plane from an end view perspective.

FIG. 9 shows schematic diagrams exemplary armature and stator magnetic fields in an interaction plane from an end view perspective.

FIG. 9a depicts a cross-section of outward-directed radial flux distributed across an arc-shaped (e.g., horse shoe-shaped) region, as may be generated by the armature 805 in the previously described interaction plane 820, for example. FIG. 9b depicts a cross-section of inward-directed radial flux distributed across an arc-shaped (e.g., horse shoe-shaped) region, as may be generated by the armature 805 in the previously described interaction plane 825, for example. FIG. 9c depicts a cross-section of inward-directed radial flux distributed across an annular region, as may be generated by the stator coil 810 at an end opposite from the interaction plane 820, for example. FIG. 9d depicts a cross-section of outward-directed radial flux distributed across an annular region, as may be generated by the stator coils 810, 815 at the respective interaction planes 820, 825, for example.

Attraction forces may occur in response to radial field components oriented in opposite direction between the stator field and the armature field. For example, thrust may be directed to attract the armature toward a stator coil in the following combinations: [9a,9c] or [9b,9d]. Repulsive forces may occur in response to radial field components oriented in the same direction between the stator field and the armature field. For example, thrust may be directed to repel the armature away from a stator coil in the following combinations: [9a,9d] or [9b,9c].

Figure 10:
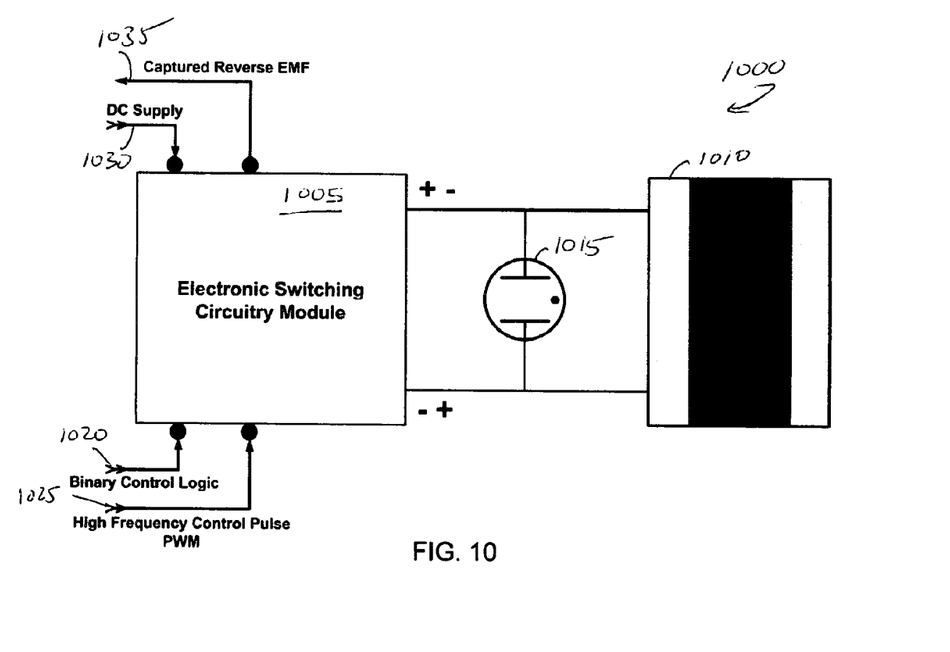
FIGS. 10-11 show schematic diagrams of exemplary stator drive and control systems arranged at the per-stator segment and system levels.
Figure 11:
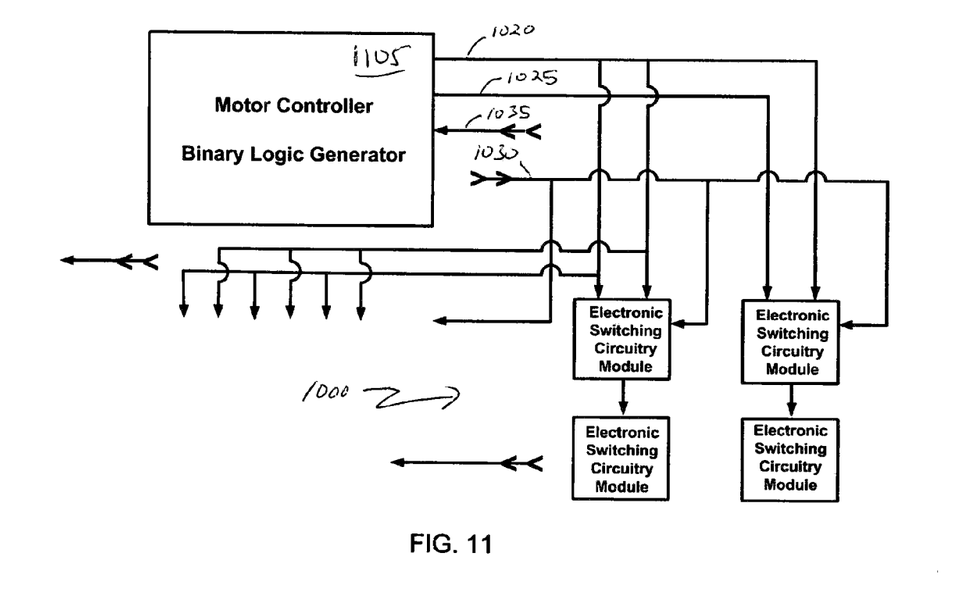

FIGS. 10-11 show schematic diagrams of exemplary stator drive and control systems arranged at the per-stator segment and system levels.

FIG. 10 depicts an exemplary drive configured to a single stator segment. A segment drive sub-system 1000 includes an electronic switching circuitry module (ESCM) 1005 coupled to provide positive or negative polarity signals to a stator solenoid coil 1010. A gas tube 1015 provides a transitional voltage clamp between pulse and capture circuits. Polarity, pulse width, timing, and on/off states are controlled by the binary logic input signals 1020. In some examples, the logic inputs may be connected by a logic buss that is common to all stator segments switching modules. The ESCM 1005 may be synchronized by a master control pulse 1025 provided by a master control module that controls motor operations and receives motor performance and command input signals.

The ESCM 1005 includes a DC supply input 1030 to power the module and supply energy to drive the solenoid coil. The ESCM 1005 further provides an output signal 1035 for sending capturing inductive (e.g., flyback) energy from the load that may otherwise be lost as heat. An exemplary circuit for controlling the solenoid coil 1010 during rapid switch turn-off and capturing and recycling the stored inductive energy are described in further detail with reference to FIG. 12.

FIG. 11 shows a series of the segment drive sub-systems 1000 configured for control by a Motor Controller/Binary Logic Generator (MC) 1105. The MC 1105 produces the clock-generated logic binary patterns that drive the switching modules. A binary data buss carries the binary logic pattern to the switching modules. In response to each clock step, the appropriate segment drive sub-systems 1000 generate magnetic fields that increment in a rotational pattern.

The speed of the motor may be controlled by the speed of the clock steps. The master control pulse may be generated by the control unit and is an output common to all switching modules. The master control pulse synchronizes the switching modules to each other. Output shaft torque may be controlled by the pulse width of the master control pulse. The MC 1105 receives motor sensor signals 1035 from one or more position and/or speed sensors, for example.

An electronic switching module drives each stator electromagnet. The switching module is a multi-polarity switch that operates from a single polarity electrical supply source. The switching module acts as a pulse width modulator and also captures Reverse Electro-Motive Force. The fly-back energy produced by the stator segment is routed to a load or storage device as usable electrical energy. This produces a reduction in input impedance by the stator segment which makes it possible to drive the stator segment with high frequency Direct Current input pulses. The pulse width (e.g., duty cycle) determines the average field density of the magnetic field produced by the electromagnet. The ESCM 1005 may output pulses and capture flyback energy in either magnetic polarity.

Figure 12:
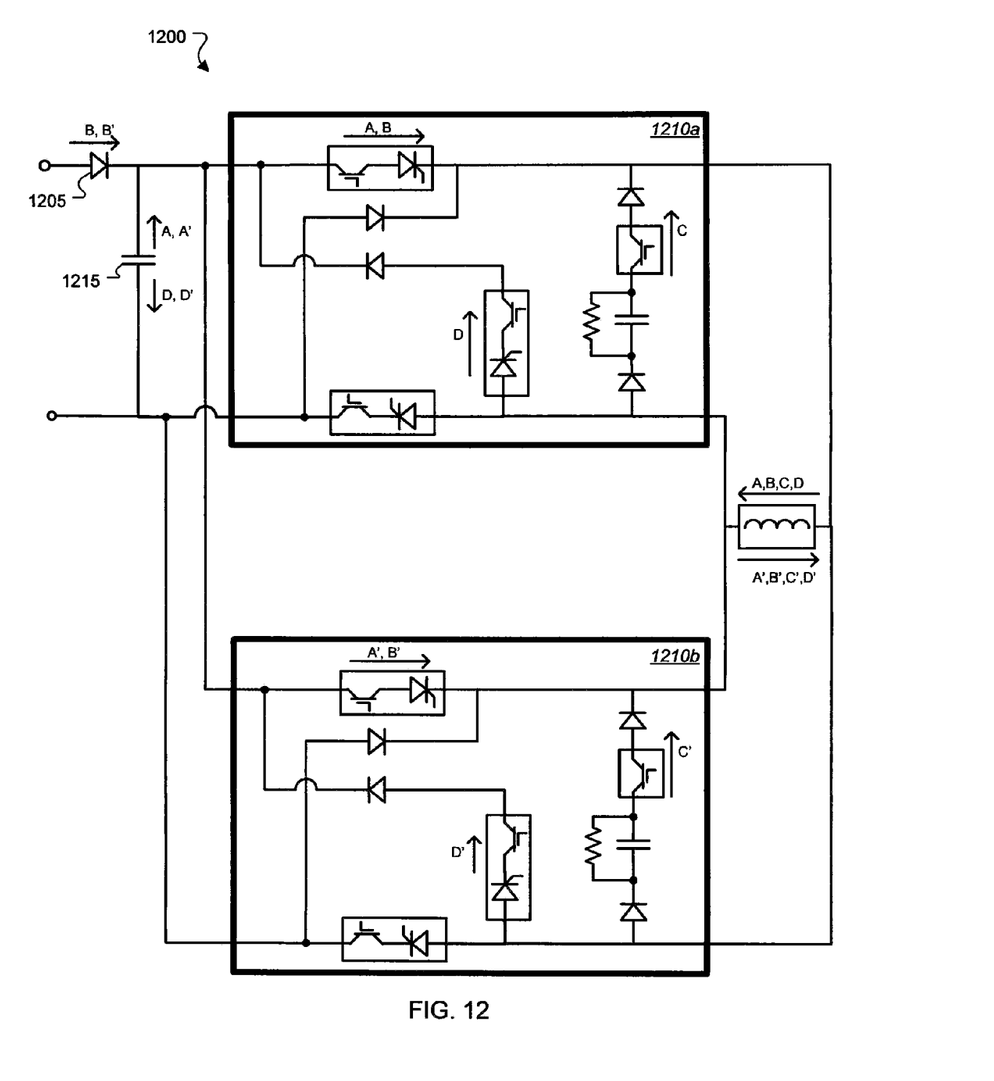
FIG. 12 shows an exemplary electronic switching circuit module as used in FIGS. 10-11.

FIG. 12 shows an exemplary electronic switching circuit module suitable for the segment drive sub-system 1000 of FIGS. 10-11. A segment drive sub-system 1200 includes an input rectifier 1205 that permits flyback capture energy from either of switch modules 1210a, 1210b to be stored in capacitor 1215 at a voltage above the source input voltage. During operation, the MC 1105 selects one of the switch modules 1210a, 1210b to deliver a positive or negative polarity pulse to the solenoid coil. At the appropriate time, as predetermined by the MC 1105 to control the armature position, speed, or torque, for example, the MC 1105 causes the switches in the selected module 1210 to connect the desired polarity input to the solenoid.

Initially, current flows from the capacitor 1215 to the load through current path A, A'. When the capacitor discharges its previously stored flyback energy, the source supplies current to the load via current path B, B'. At the end of the pulse, the MC 110 may activate a transitional voltage clamp which passes current for a short interval while the switches turn off, forcing load current to flow through current path C, C'. The current then switches to path D, D' to allow the leakage energy remaining in the solenoid coil to be recaptured and stored for use on the subsequent cycle.

Although various embodiments have been described with reference to the figures, other embodiments are possible. For example, this document describes exemplary systems for new electric machines and related apparatus and methods for supplying and/or generating electrical excitation using embodiments of the new electrical machine systems. Various exemplary systems include switching modules. For all purposes, including for example its disclosure of exemplary switching modules as described with reference to FIGS. 1-4, this document incorporates by reference the entire contents of U.S. Pat. No. 7,602,157 to Babcock, et al., entitled "Supply Architecture for Inductive Loads."

Some disclosed embodiments include switch modules in combination with transformers. For all purposes, including for example its disclosure of AC operation as described with reference to FIG. 3A, this document incorporates by reference the entire contents of U.S. Publ. 2009/0073726 to Babcock, et al., entitled "Current Waveform Construction to Generate AC Power with Low Harmonic Distortion from Localized Energy Sources."

In an exemplary embodiment, the force or thrust generated on the armature may be a function of the size of the region of interaction among the fields. In various embodiments, the armature may be attracted toward a stator coil when, for example, the field lines interact to cancel, or weaken, the energy stored in the magnetic field. Field interactions between stator and armature may occur between radial, tangential, and/or axial components of flux.

In some embodiments, the stator design may be a split toroid arrangement of solenoid type coils with ferrous cores and conductive windings that act as individually controlled electro-magnets. Individual control of the electro-magnets may be accomplished electronically with semiconductors. Each coil may have an electronic switching module that is controlled by binary data. The electronic switching module may be used to control magnetic polarity, control average coil magnetic field density with pulse width modulation and to capture counter Electro-motive force from the coil. Counter Electro-motive force that has been captured by the switching modules may be used as a secondary power source for the motor. The stator may be the stationary element of the motor but generates moving magnetic fields. This may be accomplished by driving the electronic switching modules with binary data from a logic generator. The stator may be mounted in a non-conductive, non-metallic housing. Using non-conductive material prevents counter-motive magnetic forces that would be produced in a metallic housing from opposing armature rotation. The stator may be mounted on a circular ring inside the housing that elevates the stator, leaving 320 degrees of open space around the circumference of the stator. The 320 degrees of open space around the stator may be where the magnetic fields between the stator and the armature interact. The armature may be composed of non-metallic arms mounted perpendicular to a metallic drive shaft. The drive shaft may be mounted on bearings perpendicular to the stator toroid and in the exact center of the stator toroid. On the end of each arm may be a non-metallic horseshoe shaped ring that holds a horseshoe shaped ring of permanent magnets. This may be called a horseshoe on horseshoe arrangement. The horseshoe arrays of permanent magnets on each end of the armature wrap around the stator. The magnetic fields produced by the magnet arrays may be circular in shape and occupy the space around the stator coils. The circular magnetic fields of the armature either push or pull against the magnetic fields of the stator. This push-pull action may be the force that drives the armature into rotation. This mechanical configuration between stator and armature may be designed to reduce or eliminate counter-motive forces between stator and armature.

In some examples, the magnetic fields in the armature may interact with the stator fields while interaction with the stator windings is reduced. The increased area that the fields interact in compensates for loss of force. Other examples for reducing or eliminating counter-motive force may be accomplished by the electronic control.

In various embodiments, the rotating magnetic fields in the stator may be always separated by at least one segment of the stator in the off or open circuit condition. The armature's magnet arrays may be always trapped between the stator's rotating magnetic fields and may be always positioned over segments of the stator in the off condition. As the magnetic fields of the armature pass over the segmented windings of the stator it cannot induce counter-motive force because those windings may be in open condition and electrical current cannot flow from induction and cannot produce any opposing magnetic fields to the armature. A motor armature that produces little or no counter-motive force can be driven to a given amount torque and speed with much less electrical power. This armature to stator configuration also reduces vibration because the push-pull arrangement between armature and stator magnetic fields produces a vibration dampening effect. The armature also uses increased length between the points of force and the output shaft to increase leverage and thus shaft torque. The design of the electric drive system of this motor may promote advantages in operation. The design of the electromagnetic elements of the motor is of a high induction concept with long lengths of conductor and efficient, highly permeable core material. In some implementations, this may produce electromagnets that have a high current to magnetic field ratio with minimal hysteresis and core loss.

The semiconductor circuits may be used to drive the electromagnets with a high frequency stream of pulsed D.C. current. The width of the D.C. current pulse may be used to control the average field density of electromagnet. The current switches may be designed to switch at high speeds with very steep on/off slopes and may be immune from destruction from polarity reversals and fly-back energy (reverse EMF) produced by the electromagnets. The current switches also operate through a broad voltage range. Substantially precise timing may be used and binary logic is used to accomplish precision high-speed timing of the electronic switches that drive the electromagnetic elements of the motor. Reverse EMF produced by the electromagnets may be controlled by a switching circuit that collapses the Reverse EMF from a high-voltage low-current state to a low-voltage high-current state while at the same time diverting the Reverse EMF energy to an output as usable energy. This technique used to control Reverse EMF greatly reduces the input impedance of the electromagnets. As such, various examples may input a high-frequency high-current pulse stream into a high induction electromagnet. Impedance to high frequencies may be reduced or eliminated so the electromagnets offer little resistance to high frequency current flow. The captured reverse EMF can be used to supplement the input power source to increase motor efficiency or it can be used to run external devices or circuits. Each electromagnet in the stator has its own switching and capture circuits that may be controlled by a two-bit binary input and a pulse width control input. All the electromagnet switching circuits may be tied to a master control pulse so that the switching circuits pulse on and capture Reverse EMF synchronously. Changing the master control pulse's width changes the average on time of all electromagnets in the stator. This translates into a change in the average magnetic field density of the rotating magnetic fields. This gives electronic control of the ft/lbs. of force exerted on the armature drive shaft. The two-bit binary input controls on/off and selects the magnetic polarity of the electromagnet. All the switching circuits input controls may be tied to a logic generator via a data buss. The logic generator may be clock driven, and generates a new switching pattern every time the clock cycles. The switching pattern changes in such a way as to advance north and south magnetic fields around and through the stator. The faster the logic generator clocks the faster the fields propagate through the stator and the faster the armature spins. Logic generator clock speed determines RPM. Changing the generator logic pattern can reverse the direction of the armature spin. A microprocessor can be used to generate logic patterns. A microprocessor can also be used to control and monitor other functions of the motor such as matching torque to load, speed control and many other functions. Using the innovative approaches of eliminating magnetic counter-motive forces between armature and stator, controlling and using reverse EMF as a power source, eliminating high induction impedance from electromagnets. Using semiconductor circuits that can switch high-current at high-voltages in multi-polarity conditions that may be immune from destruction of fly-back collapse, and controlling all motor function with a digital logic system has produced an extremely efficient and powerful D.C. electric motor.

In accordance with an exemplary embodiment, various machines as described herein may be operated as a generator by allowing current to flow in a coil segment while armature flux has substantial coupling to the coil. Accordingly, regenerative braking may be implemented, for example, in an electric vehicle application. Kinetic energy of the armature and any connected load (e.g., flywheel) can be recovered by storing the energy coupled into the stator coil segments in a battery, for example.

A number of implementations have been described. Nevertheless, it will be understood that various modification may be made. For example, advantageous results may be achieved if the steps of the disclosed techniques were performed in a different sequence, or if components of the disclosed systems were combined in a different manner, or if the components were supplemented with other components. Accordingly, other implementations are within the scope of the following claims.

What is claimed is:

1. A electromagnetic device, comprising:
   a plurality of stationary field generator modules arranged along a path of motion, each one of the stationary field generator modules comprising:
      a central axis extending between first and second opposite ends and lying substantially along the path of motion; and
      an electric coil arranged to produce a stator magnetic field oriented radially with respect to the path of motion and lying substantially within a field interaction plane that is orthogonal to the path of motion;
   at least one armature, each of the at least one armature comprising:
      a base member extending between opposite first and second faces and arranged to partially surround one or more of the plurality of stationary field generator modules as the armature travels along the path of motion; and,
      an armature field generator module arranged to produce an armature magnetic field comprising magnetic flux oriented radially with respect to the path of motion and lying substantially within the field interaction plane; and,
   at least one linking member to support and guide a corresponding one of each of the at least one armature along the path of motion in response to thrust on the armature generated in response to interaction of the stator magnetic field and the armature magnetic field in the field interaction plane,
      wherein when any one of the at least one armature overlaps a stationary field generator module, the overlapped field generator module is maintained in a substantially zero-current state.

2. The device of claim 1, wherein the field interaction plane is disposed in a region between the stationary field generator module producing the stator magnetic field and the armature producing the armature magnetic field.

3. The device of claim 1, wherein said armature field generator module further comprises a plurality of horse-shoe shaped permanent magnet modules arranged around a circumference of the base member.

4. The device of claim 1, further comprising a housing with a relative magnetic permeability less than 1.20, wherein said housing substantially encloses said plurality of stationary field generator modules and said at least one armature.

5. A method to accelerate a load, the method comprising:
   providing a plurality of toroidal coil segments, each of the coil segments arranged with a central axis aligned substantially tangential to a path of motion;
   providing an armature base movable along the path of motion;
   generating from the armature base a first radially-directed magnetic flux in a first substantially arc-shaped region in a first plane exterior to the armature base, wherein the first plane intersects and is substantially orthogonal to the path of motion; and,
   generating from at least one of the plurality of toroidal coil segments a second radially-directed magnetic flux in at least a portion of the first substantially arc-shaped region,
   wherein when the armature base overlaps a toroidal coil segment, the overlapped toroidal coil segment is maintained in a substantially zero-current state.

6. The method of claim 5, wherein the step of generating from at least one of the plurality of toroidal coil segments the second radially-directed magnetic flux in at least a portion of the first substantially arc-shaped region comprises applying a current signal of a first polarity to a winding associated with the at least one of the plurality of toroidal coil segments.

7. The method of claim 6, wherein the step of applying the current signal comprises injecting a current signal of the first polarity when the armature is positioned relative to one of the plurality of toroidal coil segments such that the second radially-directed magnetic flux generated in response to the applied current signal lies within the first plane exterior to the armature base.

8. The method of claim 7, wherein the step of applying the current signal further comprises ceasing to inject the current signal to the toroidal coil segment while an amount of flux coupling from the armature to the toroidal coil segment exceeds a predetermined threshold level.

9. The method of claim 7, further comprising injecting a second current signal of opposite polarity to the first polarity when the armature is positioned relative to the toroidal coil segment such that the second radially-directed magnetic flux generated in response to the second current signal lies within a second plane exterior to the armature base and on an opposite side of the armature relative to the first plane.

10. The method of claim 5, further comprising disabling current flow in each one of the toroidal coil segments to reduce counter-electromotive force (CEMF) as each one of the coil segments is overlapped by the armature.

11. The method of claim 10, further comprising disabling current flow in each one of the toroidal coil segments to reduce counter-electromotive force (CEMF) so that none of the coil segments couples more than a predetermined threshold amount of magnetic flux from the armature.

12. The method of claim 11, wherein the predetermined threshold amount of magnetic flux is determined as a predetermined function of armature speed.

13. The method of claim 5, further comprising:
generating from the armature base a third radially-directed magnetic flux in a second substantially arc-shaped region in a second plane exterior to the armature base on an opposite side of the armature relative to the first plane, wherein the second plane intersects and is substantially orthogonal to the path of motion; and,
generating from at least one of the plurality of toroidal coil segments a fourth radially-directed magnetic flux in at least a portion of the second substantially arc-shaped region,
wherein said third radially-directed flux is directed in an opposite orientation with respect to said first radially-directed flux, and said fourth radially-directed flux is directed in the same orientation with respect to said second radially-directed flux.

14. A electromagnetic device, comprising:
a plurality of stationary field generator modules arranged along a path of motion, each one of the stationary field generator modules comprising:
   a central axis extending between opposite first and second ends and lying substantially along the path of motion; and
   an electric coil responsive to a current signal in a first polarity to produce a north pole having a magnetic field oriented radially and directed outward substantially within a first plane that is orthogonal to a line extending from the central axis to a point exterior to the first end, and responsive to the current signal in the first polarity to produce a south pole having a magnetic field oriented radially and directed inward substantially within a second plane that is orthogonal to a line extending from the central axis to a point exterior to the second end;
at least one armature, each of the at least one armature comprising:
   a base member extending between opposite first and second faces and arranged to partially surround one or more of the plurality of stationary field generator modules as the armature travels along the path of motion;
   an armature field generator module arranged to generate a north pole magnetic field comprising magnetic flux oriented radially outward substantially within a third plane that is orthogonal to the path at a point exterior to the first face, and
   an armature field generator module arranged to generate a south pole magnetic field comprising magnetic flux oriented radially inward substantially within a fourth plane that is orthogonal to the path at a point exterior to the second face,
a linking member to guide the armature along the path of motion in response to thrust of the armature generated upon intersection of either of the first or second planes with either of the third or fourth planes,
wherein when any one of the at least one armature overlaps a stationary field generator module, the overlapped field generator module is maintained in a substantially zero-current state.

15. The device of claim 14, further comprising a shaft coupled to the linking member for coupling to a load to transfer energy from the at least one armature to the load.

16. The device of claim 14, wherein the central axis is linear in at least one of the plurality of stationary field generators.

17. The device of claim 14, wherein the central axis comprises a curved portion in at least one of the plurality of stationary field generators.

18. The device of claim 14, wherein the stationary field generator modules define a substantially cylindrical geometry with a central axis disposed tangential to the path.

19. The device of claim 14, wherein the north pole is orthogonal to a line extending from the central axis to the point exterior to the first end, and the south pole is orthogonal to a line extending from the central axis to the point exterior to the second end.

20. The device of claim 14, wherein said intersecting planes are approximately co-planar.

* * * * *